United States Patent
Delazari Binotto et al.

(10) Patent No.: US 10,914,852 B2
(45) Date of Patent: Feb. 9, 2021

(54) UNSUPERVISED IDENTIFICATION OF SEISMIC HORIZONS USING SWARMS OF COOPERATING AGENTS

(71) Applicant: INTERNATIONAL BUSINESS MACHINES CORPORATION, Armonk, NY (US)

(72) Inventors: Alecio Pedro Delazari Binotto, São Paulo (BR); Michael Raghib Moreno, Rio de Janerio (BR); Matthias Kormaksson, Rio de Janerio (BR); Vagner Figueredo De Santana, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1001 days.

(21) Appl. No.: 15/461,063

(22) Filed: Mar. 16, 2017

(65) Prior Publication Data
US 2018/0267186 A1    Sep. 20, 2018

(51) Int. Cl.
*G01V 1/30*    (2006.01)
*G06N 5/04*    (2006.01)

(52) U.S. Cl.
CPC ............. *G01V 1/301* (2013.01); *G06N 5/043* (2013.01); *G01V 2210/642* (2013.01); *G01V 2210/643* (2013.01)

(58) Field of Classification Search
CPC ............. G01V 1/301; G01V 2210/642; G01V 2210/643
See application file for complete search history.

(56) References Cited

U.S. PATENT DOCUMENTS

| 5,999,885 A | 12/1999 | Van Bemmel et al. |
| 7,203,342 B2 | 4/2007 | Pedersen |

(Continued)

FOREIGN PATENT DOCUMENTS

| CN | 105093289 | 11/2015 |
| WO | WO99/64896 | 12/1999 |

(Continued)

OTHER PUBLICATIONS

CN105093289A_English Translation.
(Continued)

*Primary Examiner* — Manuel A Rivera Vargas
*Assistant Examiner* — Yaritza H Perez Bermudez
(74) *Attorney, Agent, or Firm* — F. Chau & Associates, LLC (57) ABSTRACT

A method for identifying seismic horizons in digitized seismic images includes deploying a swarm of agents at an initial position in a seismic image to be analyzed, where the swarm of agents includes picking agents that define a direction for the swarm and averaging agents that smooth the direction of the swarm, identifying a direction to follow in the seismic image for each picking agent, and advancing each picking agent in the identified direction, and averaging, by the averaging agents, the directions identified by the picking agents, wherein if an information concentration measured by a picking agent at a current time step is greater than a previous time step, the picking agent keeps a previous direction, otherwise the picking agent changes direction according to the average current state of the set of averaging agents within its neighborhood.

26 Claims, 5 Drawing Sheets

(56) References Cited

U.S. PATENT DOCUMENTS

| | | | |
|---|---|---|---|
| 7,777,606 B2* | 8/2010 | Akbar | G01V 1/364 |
| | | | 337/35 |
| 8,265,876 B1 | 9/2012 | Yu et al. | |
| 8,447,524 B2 | 5/2013 | Chen et al. | |
| 8,811,677 B2 | 8/2014 | Guillon et al. | |
| 9,008,972 B2 | 4/2015 | Imhof et al. | |
| 2002/0126896 A1* | 9/2002 | Pedersen | G01V 1/30 |
| | | | 382/190 |
| 2011/0048731 A1 | 3/2011 | Imhof et al. | |
| 2011/0286305 A1* | 11/2011 | Artman | G01V 1/282 |
| | | | 367/38 |
| 2014/0214328 A1* | 7/2014 | Hauk S | G01V 1/288 |
| | | | 702/16 |
| 2016/0086079 A1* | 3/2016 | De Stefano | G06N 3/04 |
| | | | 706/12 |
| 2018/0045843 A1* | 2/2018 | Sheiko | C09K 8/035 |
| 2018/0267186 A1* | 9/2018 | DeLazari Binotto | G01V 1/301 |

FOREIGN PATENT DOCUMENTS

| | | |
|---|---|---|
| WO | WO 2011149609 | 12/2011 |
| WO | WO 2014023737 A2 | 2/2014 |
| WO | WO 2014023737 A3 | 2/2014 |
| WO | WO 2014071321 | 5/2014 |
| WO | WO 2015053756 | 4/2015 |

OTHER PUBLICATIONS

Colin Torney, et al.,"Context-Dependent Interaction Leads to Emergent Search Behavior in Social Aggregates", PNAS, Dec. 29, 2009, vol. 106, No. 52, pp. 22055-22060.

\* cited by examiner

UNSUPERVISED IDENTIFICATION OF SEISMIC HORIZONS USING SWARMS OF COOPERATING AGENTS

BACKGROUND

1. Technical Field

Embodiments of the present disclosure are directed to systems and methods that, given a seismic image, can identify seismic horizons using a swarm of agents.

2. Discussion of the Related Art

Figure 1:
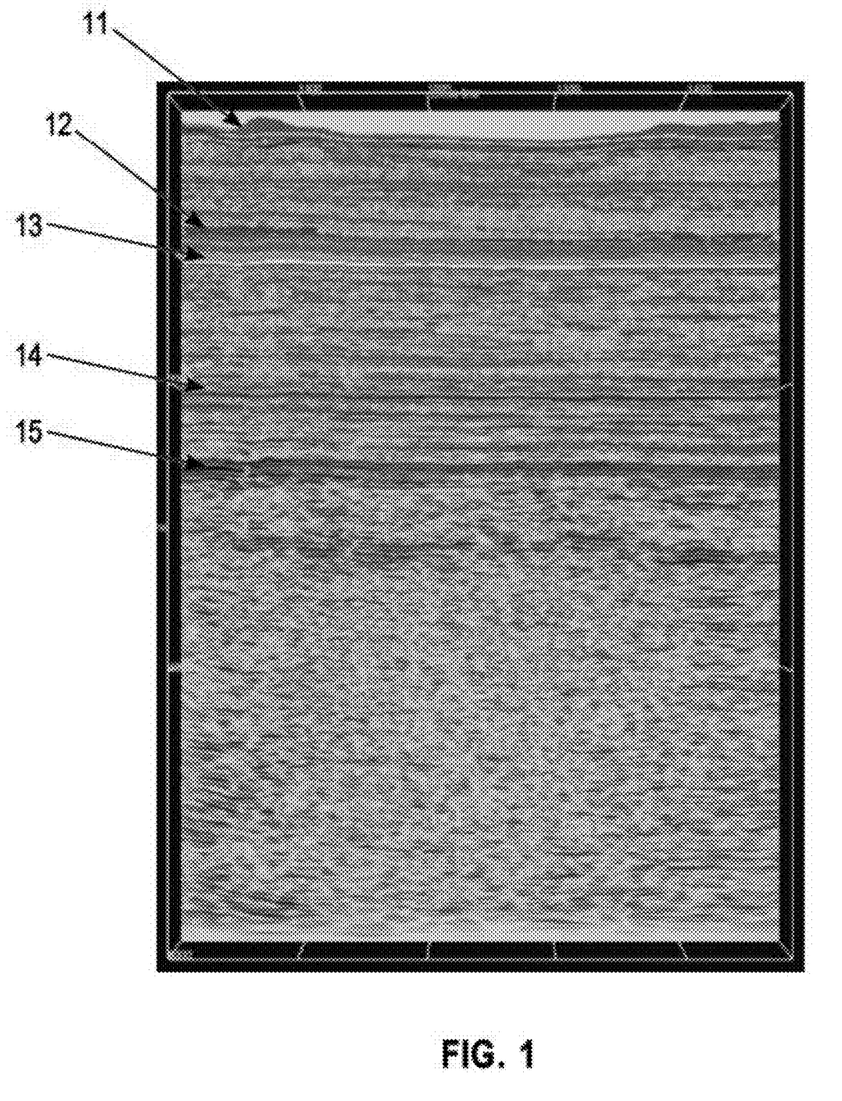
FIG. 1 is an exemplary image of seismic strata, according to an embodiment of the disclosure.

Seismic interpretation is the process by which seismic images are translated into a model of the subsurface. This process is of fundamental importance in the oil and gas industry, as oil and gas companies are heavily dependent on accurate seismic interpretations in order to characterize subsurface layers. Identifying horizons in the seismic data is one of the most time consuming tasks in the exploration and production process. Correct horizons identify the layers in which geological information will be determined. These horizons separate layers of rock with different properties, helping in the identification of potential hydrocarbon traps, as well as many other geological features. The same type of rock or bedding can be very fractured/faulted in one location and pristine in another. Fractures/discontinuities depend on the history of tectonic forces which may have disturbed the formations. Discontinuities may also be due to so-called unconformities, which are due to patterns of erosion/deposition rather than tectonics. During this task, the seismic interpreter frequently has to make choices under high uncertainty and ambiguity. Errors can be extremely costly, on the order of tens to hundreds of millions of dollars. An exemplary image of seismic strata is shown in FIG. 1, which shows horizons 11, 12, 13, 14, and 15 between different layers of rock.

SUMMARY

Embodiments of the present disclosure are directed to systems and methods for unsupervised identification of seismic horizons in digital images using swarms of cooperating agents.

According to an embodiment of the disclosure, there is provided a method for identifying seismic horizons in digitized seismic images that includes deploying a swarm of agents at an initial position in a seismic image to be analyzed, where the swarm of agents includes picking agents that define a direction for the swarm and averaging agents that smooth the direction of the swarm, identifying a direction to follow in the seismic image for each picking agent, and advancing each picking agent in the identified direction, averaging, by the averaging agents, the directions identified by the picking agents, where if an information concentration measured by a picking agent at a current time step is greater than a previous time step, the picking agent keeps a previous direction, otherwise the picking agent changes direction according to the average current state of the set of averaging agents within its neighborhood, and repeating the steps of identifying a direction to follow in the seismic image and averaging the directions identified by the picking agents until an end of a horizon is reached in the seismic image.

According to a further embodiment of the disclosure, the information concentration is based on a variance in pixel values within a field of pixel configurations.

According to a further embodiment of the disclosure, the picking agents initially follow a random walk based on an average current state of the averaging agents within a neighborhood window, and a field of pixel configurations within a predefined detection zone around each picking agent, where the average current state includes a mean orientation angle and a mean position relative to a focal agent computed from the averaging agents found within an interaction zone of the focal individual, where an average between two unit vectors associated with the mean position and mean orientation yields a new direction for a next time step, and where a size of the detection zone is chosen so that a group of picking agents move as a single unit According to a further embodiment of the disclosure, the averaging agents perform the averaging of directions continuously as the picking agents advance.

According to a further embodiment of the disclosure, the initial position can be the top left or top right corner of the seismic image, where the swarm of agents travels from top to the bottom while identifying horizons throughout the seismic image.

According to a further embodiment of the disclosure, the method includes, when the swarm of agents has reached the end of the horizon at an edge of seismic image, placing the swarm of agents in a next higher amplitude value in the edge of the seismic image, repeating the steps of identifying a direction to follow in the seismic image and averaging the directions identified by the picking agents until an end of another horizon is reached in the seismic image, and when an end of the seismic image has been reached, stopping the identification of horizons.

According to a further embodiment of the disclosure, the method includes determining whether an ambiguity has been found by comparing a proportion of picking agents that disagree in following a certain direction with a predetermined threshold, testing for a maximum number of agents, when an ambiguity has been found, and stopping the identification of horizons, when the maximum number of agents has been reached.

According to a further embodiment of the disclosure, the method includes, if the maximum number of agents has not been reached, creating and deploying more agents in a current region, and determining whether a horizon diverges.

According to a further embodiment of the disclosure, the two swarms are merged, when picking agents from different swarms converge.

According to a further embodiment of the disclosure, the method includes, if the horizon diverges, splitting the swarm agents and selecting both horizons, and repeating the steps of identifying a direction to follow in the seismic image and averaging the directions identified by the picking agents until then ends of the two horizons are reached in the seismic image.

According to a further embodiment of the disclosure, the method includes, if the horizon does not diverge, determining whether a discontinuity or a fault has been found.

According to a further embodiment of the disclosure, the method includes, if no discontinuity or fault has been found, repeating the steps of identifying a direction to follow in the seismic image and averaging the directions identified by the picking agents until then end of the horizon is reached in the seismic image.

According to a further embodiment of the disclosure, the method includes, if a discontinuity or fault has been found, creating a pair of texture agents for each picking agent, placing the pair of texture agents at the same coordinates of the corresponding picking agent, where one texture agent will travel up and the other texture agent will travel down to identify sub-horizons that that the picking agent should follow, repeating the steps of identifying a direction to follow in the seismic image and averaging the directions identified by the picking agents until then end of the horizon is reached in the seismic image, and killing the texture agents when the corresponding picking agents identifies the corresponding horizon.

According to another embodiment of the disclosure, there is provided a non-transitory program storage device readable by a computer, tangibly embodying a program of instructions executed by the computer to perform the method steps for identifying seismic horizons in digitized seismic images.

DETAILED DESCRIPTION OF EXEMPLARY EMBODIMENTS

Exemplary embodiments of the disclosure as described herein generally provide systems and methods for implementing a method for unsupervised identification of seismic horizons in digital images using swarms of cooperating agents. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-dimensional images and voxels for 3-dimensional images). The image may be, for example, an image of a subject collected by any imaging system known to one of skill in the art. Although an image can be thought of as a function from $R^3$ to R, methods of the disclosure are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In addition, seismic images according to embodiment of the disclosure may also refer to the visualization of a slice of a seismic cube in the SEGY format developed by the Society of Exploration Geophysicists (SEG) or any other data format used by seismic interpretation software. Thus, a pixel value can refer to the visual representation of seismic data, rendered by any seismic interpretation software. Moreover, a 2D seismic image can be part of a seismic cube or image volume, which is 3D data, and that the methods and systems according to embodiments of the disclosure can be used to identify seismic horizons in one or more slices of a seismic cube.

Systems and methods for unsupervised identification of seismic horizons in digital images according to embodiments use a combination of reinforcement learning and swarms of agents for any exploration and production software process and can be incorporated into any cognitive system in the oil and gas industry. In the process of understanding seismic interpreter activity, it has been observed that collaboration often occurs between interpreters when they face ambiguities. Embodiments of the disclosure can apply this concept of collaboration among intelligent agents to surpass ambiguities during the identification of seismic horizons.

According to embodiments, a swarm of agents can move collectively about a seismic image following a carefully constructed type of collective random walk. The set of agents includes picking agents, averaging agents, and texture agents. Picking agents can define the direction of the swarm, responding to both social cues and the pixel values being analyzed. Averaging agents enhance the signal-to-noise ratio by smoothing the direction of the swarm. The number of averaging agents can be increased as the horizon in question becomes harder to follow, as their role is to average noise and allow the signal to be detected by the picking agents. Texture agents can support picking agents when a fault or discontinuity is found. The texture agents can support the picking agents in identifying the corresponding horizon when a fault/discontinuity is found, by identifying a texture above and below the current horizon. Embodiments of the disclosure can blend multiple approaches for picking horizons.

Figure 2:
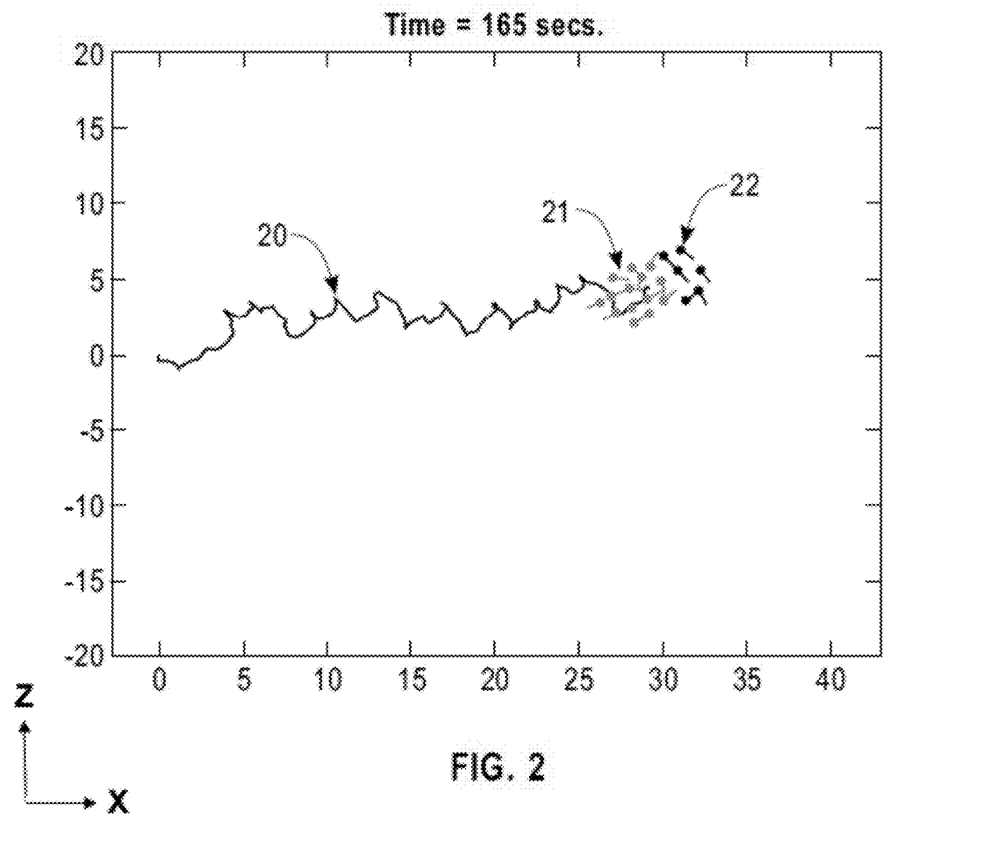
FIG. 2 is an example of how different types of agents can be used, according to an embodiment of the disclosure.

FIG. 2 is a screenshot of a video that illustrates how two types of agents interact, according to an embodiment of the disclosure. This figure exemplifies the carefully constructed type of collective random walk that is considered in embodiments of this disclosure. Each circle represents an agent and the arrows indicate the direction each of them is pointing. The circles 21 represent averaging agents, and the circles 22 represent picking agents. Thus, they collaborate to define the direction to draw the curve 20.

Figure 3:
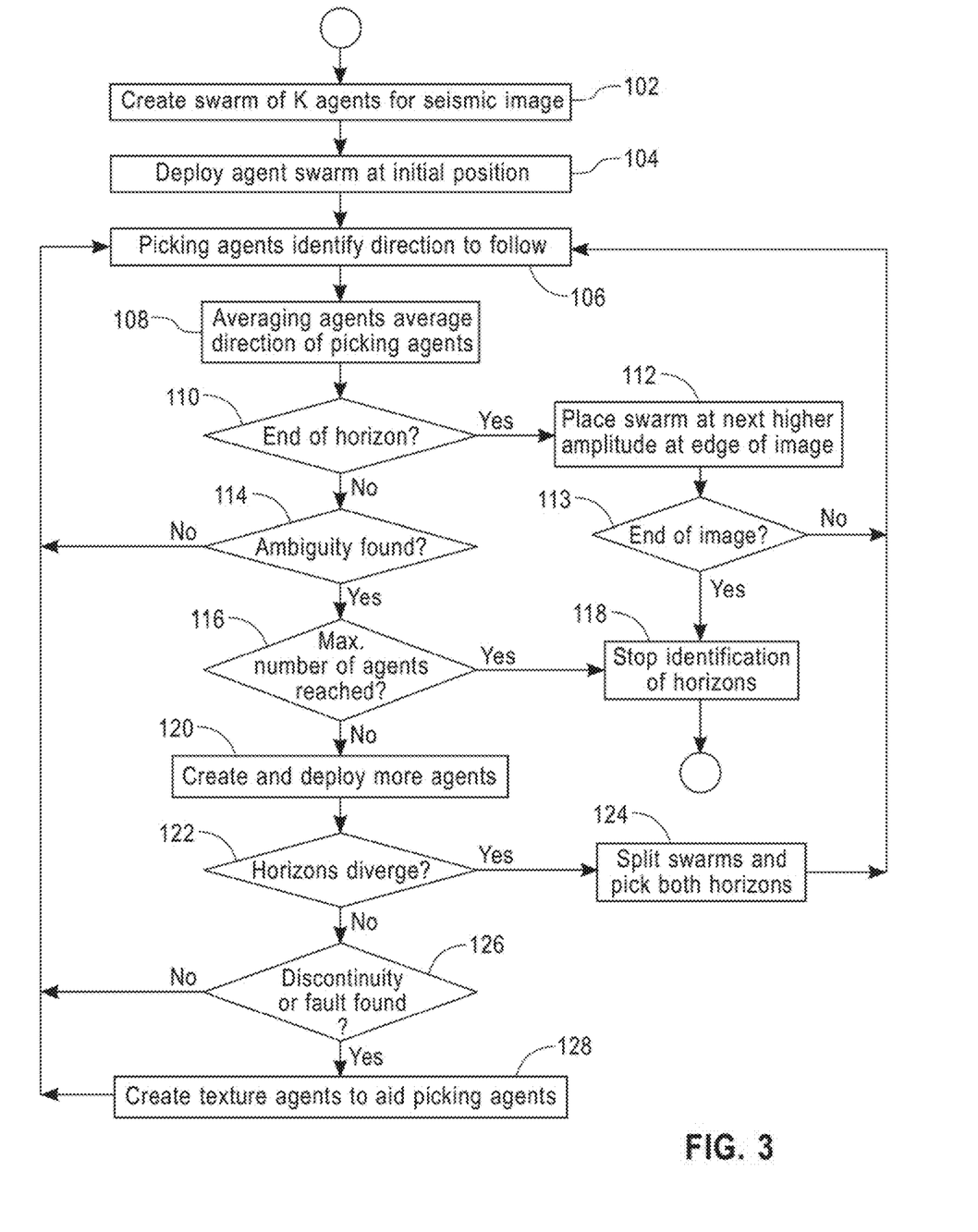
FIG. 3 is a flow chart of an exemplary method of unsupervised identification of seismic horizons in digital images using swarms of cooperating agents, according to an embodiment of the disclosure.

FIG. 3 is a flow chart of an exemplary method according to an embodiment of the disclosure of unsupervised identification of seismic horizons in digital images using swarms of cooperating agents. Referring to the figure, a method begins at step 102 by receiving a seismic image and creating a swarm of K agents, divided into two groups, picking agents and averaging agents. The number K and the proportion of picking to averaging agents can be predefined or user defined. If the picking agents use different picking methods, i.e., an ensemble of methods, the methods can be predefined or selected by the user. A method continues at step 104 by deploying the swarm of agents at an initial position in the seismic image to be analyzed. The initial position can be the top left or top right corner, assuming that the swarm will travel from top to the bottom while identifying horizons throughout the seismic image. Embodiments are not limited thereto, and in other embodiments, the initial position can be the bottom left or bottom right corner, and the swarm will travel from the bottom to the top of the image. In an additional embodiment, the starting point can be user defined, for instance, the user clicks over the desired horizon to be fully identified by the agents. If the initial position is in a homogenous low amplitude region, such as water above the bottom of the ocean, the first high amplitude horizon is located. In still other embodiments, the initial position may also be determined by the user.

At step 106, some picking agents have identified a direction to follow, and are advanced in that direction. Initially, the picking agents follow a coupled random walk, in that they are coupled to both the average current state, i.e. positions and orientation, of the averaging agents within a neighborhood window, and the "environment", which in this case is the field of pixel configurations within a predefined detection zone around each picking agent. The size of the detection zone varies but it can be chosen so as to ensure the group-level coupling required to make it move as a single unit. The user can determine the size, which then becomes a hard constraint directly affecting the calculations. Within such a field of pixel configurations, each picking agent measures an "information concentration" measured by the variance in pixel values. If the information concentration at a current time step is higher than a previous one, then the picking agent keeps the previous direction, otherwise it changes direction according to the average current state of the set of "averaging agents" that fall within its neighborhood. The average current state includes two averages computed from the agents found within the interaction zone of a given individual. These two averages are the mean angle of orientation and the mean position, relative to the focal individual. The simple average between the two unit vectors associated with the mean position and mean orientation yields the new direction for the next time step.

At step 108, the averaging agents average the directions identified by the picking agents. The averaging agents perform the averaging of directions continuously as the picking agents advance. If picking agents from different swarms converge, this means that the picking agents will start to follow the same horizon, in which case the two swarms are merged. Steps 106 and 108 are repeated from step 110 if there are no ambiguities until the end of a horizon is reached. The end of the horizon is reached when there is no ambiguity, i.e., at the edge of the seismic image.

If the swarm has reached the end of the horizon at the edge of seismic image, then, at step 112, the swarm is placed in the next higher amplitude value in the current edge of the seismic image. If, at step 113, the end of the seismic image has been reached, the identification of horizons ends at step 118, otherwise the method repeats from step 106.

If, at step 110, the end of a horizon has not been reached, it is determined whether an ambiguity has been found at step 114 by comparing the proportion of picking agents that disagree in following a certain direction with a predetermined threshold. The threshold proportion can be system defined or user defined.

If no ambiguity has been found, the method returns to step 106, as disclosed above. If an ambiguity has been found, the method tests for a maximum number of agents at step 116. A maximum number of agents can be determined automatically, by considering the available computer power, or be user defined, when a user wants a quicker response time.

If the maximum number of agents has been reached, then at step 118, the identification of horizons ends. If the maximum number of agents has not been reached, then, at step 120, more agents are created and deployed at the current region.

At step 122, it is determined whether a horizon diverges. A horizon diverges when there is a discontinuity. For example, there can be a pinch out when a horizon branches out into two, or when a fault creates a sudden change upwards or downwards in the location of the horizon. If the horizon diverges, then, at step 124, the swarm splits and both horizons are selected. In the case of a split swarm, if the picking agents are using an ensemble of picking methods, then each new swarm has the same types and proportions of picking agents. According to embodiments, agents of different swarms do not interact with each other. If the horizon does not diverge, then at step 126, it is determined whether a discontinuity or a fault has been found. If no discontinuity or a fault has been found, the method returns to step 106 for the picking agents to identify a directions to follow. If a discontinuity or a fault has been found, then at step 128, a pair of texture agents is created for each picking agent and placed at the same coordinates of the corresponding picking agent. Thus one texture agent will travel up and the second will travel down to identify sub-horizons that that the picking agent should follow, and the method returns to step 106 for the picking agents to identify a directions to follow. Once that the picking agents identifies the corresponding horizon, texture agents are killed.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud; the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
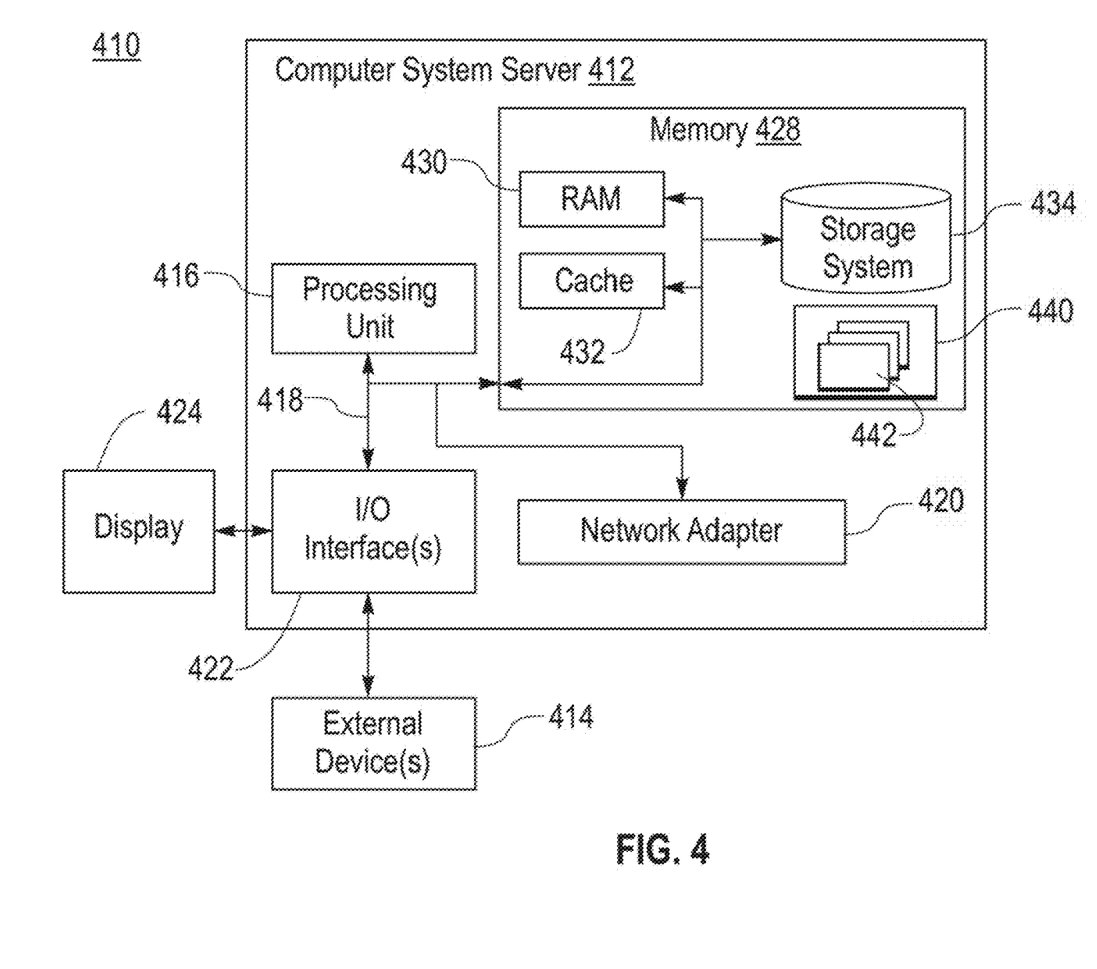
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-knower computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a his 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
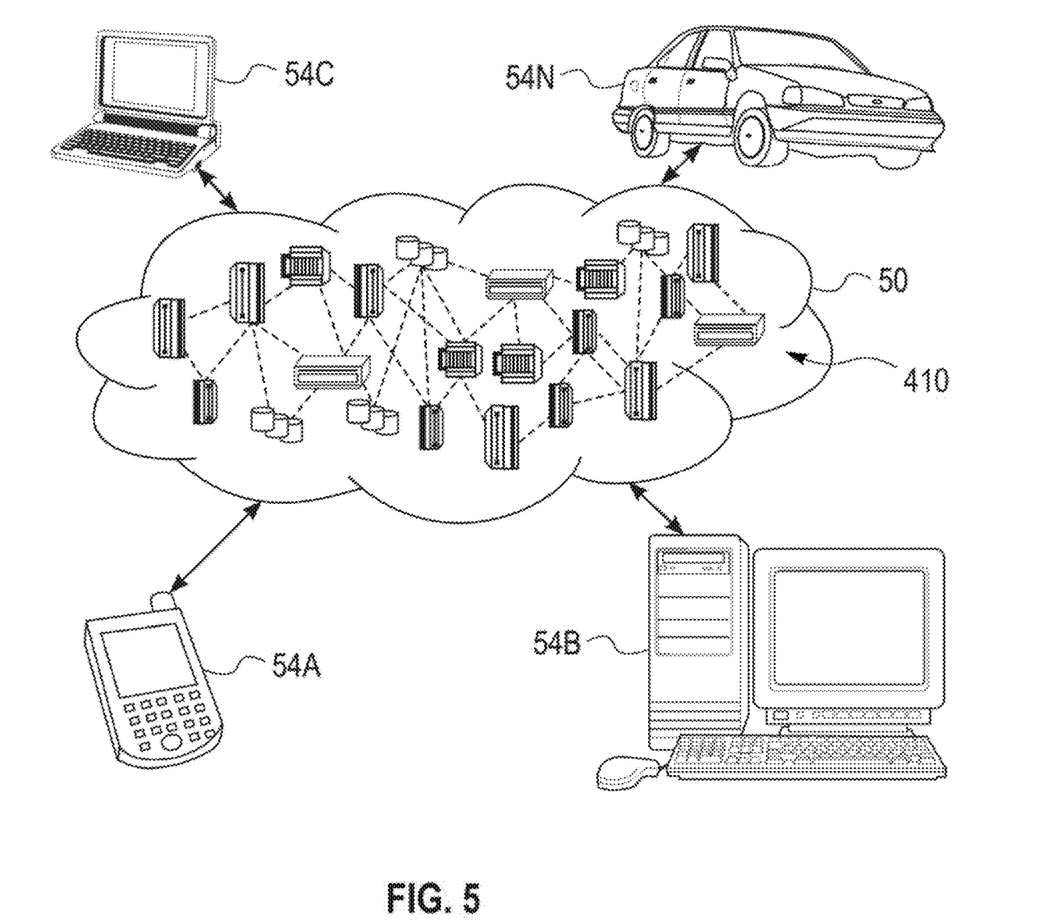
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for identifying seismic horizons in digitized seismic images, comprising the steps of:
   deploying a swarm of agents at an initial position in a seismic image to be analyzed, wherein the swarm of agents includes picking agents that define a direction for the swarm and averaging agents that smooth the direction of the swarm;
   identifying a direction to follow in the seismic image for each picking agent, and advancing each picking agent in the identified direction;
   averaging, by the averaging agents, the directions identified by the picking agents, wherein if an information concentration measured by a picking agent at a current time step is greater than a previous time step, the picking agent keeps a previous direction, otherwise the picking agent changes direction according to the average current state of the set of averaging agents within its neighborhood; and
   repeating said steps of identifying a direction to follow in the seismic image and averaging the directions identified by the picking agents until an end of a horizon is reached in the seismic image.

2. The method of claim 1, wherein the information concentration is based on a variance in pixel values within a field of pixel configurations.

3. The method of claim 1, wherein the picking agents initially follow a random walk based on an average current state of the averaging agents within a neighborhood window, and a field of pixel configurations within a predefined detection zone around each picking agent, wherein the average current state includes a mean orientation angle and a mean position relative to a focal agent computed from the averaging agents found within an interaction zone of the focal individual, wherein an average between two unit vectors associated with the mean position and mean orientation yields a new direction for a next time step, and wherein a size of the detection zone is chosen so that a group of picking agents move as a single unit.

4. The method of claim 1, wherein the averaging agents perform the averaging directions continuously as the picking agents advance.

5. The method of claim 1,
   wherein the initial position can be the top left or top right corner of the seismic image,
   wherein the swarm of agents travels from top to the bottom while identifying horizons throughout the seismic image.

6. The method of claim 1, further comprising, when the swarm of agents has reached the end of the horizon at an edge of seismic image,
   placing the swarm of agents in a next higher amplitude value in the edge of the seismic image,
   repeating said steps of identifying a direction to follow in the seismic image and averaging the directions identified by the picking agents until an end of another horizon is reached in the seismic image, and
   when an end of the seismic image has been reached, stopping the identification of horizons.

7. The method of claim 1, further comprising
   determining whether an ambiguity has been found by comparing a proportion of picking agents that disagree in following a certain direction with a predetermined threshold;

testing for a maximum number of agents, when an ambiguity has been found; and stopping the identification of horizons, when the maximum number of agents has been reached.

8. The method of claim 7, further comprising, if the maximum number of agents has not been reached, creating and deploying more agents in a current region, and determining whether a horizon diverges.

9. The method of claim 8, wherein when picking agents from different swarms converge, the two swarms are merged.

10. The method of claim 8, further comprising, if the horizon diverges, splitting the swarm agents and selecting both horizons, and repeating said steps of identifying a direction to follow in the seismic image and averaging the directions identified by the picking agents until then ends of the two horizons are reached in the seismic image.

11. The method of claim 8, further comprising, if the horizon does, not diverge, determining whether a discontinuity or a fault has been found.

12. The method of claim 11, further comprising, if no discontinuity or fault has been found, repeating said steps of identifying a direction to follow in the seismic image and averaging the directions identified by the picking agents until then end of the horizon is reached in the seismic image.

13. The method of claim 11, further comprising, if a discontinuity or fault has been found, creating a pair of texture agents for each picking agent, placing the pair of texture agents at the same coordinates of the corresponding picking agent, wherein one texture agent will travel up and the other texture agent will travel down to identify sub-horizons that that the picking agent should follow, repeating said steps of identifying a direction to follow in the seismic image and averaging the directions identified by the picking agents until then end of the horizon is reached in the seismic image, and killing the texture agents when the corresponding picking agents identifies the corresponding horizon.

14. A non-transitory program storage device readable by a computer, tangibly embodying a program of instructions executed by the computer to perform the method steps for identifying seismic horizons in digitized seismic images, the method comprising the steps of:

deploying a swarm of agents at an initial position in a seismic image to be analyzed, wherein the swarm of agents includes picking agents that define a direction for the swarm and averaging agents that smooth the direction of the swarm;

identifying a direction to follow in the seismic image for each picking agent, and advancing each picking agent in the identified direction;

averaging, by the averaging agents, the directions identified by the picking agents, wherein if an information concentration measured by a picking agent at a current time step is greater than a previous time step, the picking agent keeps a previous direction, otherwise the picking agent changes direction according, to the average current state of the set of averaging agents within its neighborhood; and repeating said steps of identifying a direction to follow in the seismic image and averaging the directions identified by the picking agents until an end of a horizon is reached in the seismic image.

15. The computer readable program storage device of claim 14, wherein the information concentration is based on a variance in pixel values within a field of pixel configurations.

16. The computer readable program storage device of claim 14, wherein the picking a gents initially follow a random walk based on an average current state of the averaging agents within a neighborhood window, and a field of pixel configurations within a predefined detection zone around each picking agent, wherein the average current state includes a mean orientation angle and a mean position relative to a focal agent computed from the averaging agents found within an interaction zone of the focal individual, wherein an average between two unit vectors associated with the mean position and mean orientation yields a new direction for a next time step, and wherein a size of the detection zone is chosen so that a group of picking agents move as a single unit.

17. The computer readable program storage device of claim 14, wherein the averaging agents perform the averaging of directions substantially continuously as the picking agents advance.

18. The computer readable program storage device of claim 14, wherein the initial position can be the top left or top right corner of the seismic image, wherein the swarm of agents travels from top to the bottom while identifying horizons throughout the seismic image.

19. The computer readable program storage device of claim 14, the method further comprising, when the swarm of agents has reached the end of the horizon at an edge of seismic image, placing the swarm of agents in a next higher amplitude value in the edge of the seismic image, repeating said steps of identifying a direction to follow in the seismic image and averaging the directions identified by the picking agents until an end of another horizon is reached in the seismic image, and when an end of the seismic image has been reached, stopping the identification of horizons.

20. The computer readable program storage device of claim 14, the method further comprising determining whether an ambiguity has been found by comparing a proportion of picking agents that disagree in following a certain direction with a predetermined threshold;

testing for a maximum number of agents, when an ambiguity has been found; and stopping the identification of horizons, when the maximum number of agents has been reached.

21. The computer readable program storage device of claim 20, the method further comprising, if the maximum number of agents has not been reached, creating and deploying more agents in a current region, and determining whether a horizon diverges.

22. The computer readable program storage device of claim 21, wherein when picking agents from different swarms converge, the two swarms are merged.

23. The computer readable program storage device of claim 21, the method further comprising, if the horizon diverge, splitting the swarm agents and selecting both horizons, and repeating said steps of identifying a direction to follow in the seismic image and averaging the directions identified by the picking agents until then ends of the two horizons are reached in the seismic image.

24. The computer readable program storage device of claim 21, the method further comprising, if the horizon does not diverge,
determining whether a discontinuity or a fault has been found.

25. The computer readable program storage device of claim 24, the method thither comprising, if no discontinuity or fault has been found,
repeating said steps of identifying a direction to follow in the seismic image and averaging the directions identified by the picking agents until then end of the horizon is reached in the seismic image.

26. The computer readable program storage device of claim 24, the method further comprising, if a discontinuity or fault has been found,
creating a pair of texture agents for each picking agent,
placing the pair of texture agents at the same coordinates of the corresponding picking agent, wherein one texture agent will travel up and the other texture agent will travel down to identify sub-horizons that that the picking agent should follow,
repeating said steps of identifying a direction to follow in the seismic image and averaging the directions identified by the picking agents until then end of the horizon is reached in the seismic image, and
killing the texture agents when the corresponding picking agents identify the corresponding horizon.

* * * * *